US012637287B2

(12) United States Patent　　　　(10) Patent No.:　US 12,637,287 B2

Becker et al.　　　　　　　　　　　　(45) Date of Patent:　　May 26, 2026

(54) BLOCK STACKING ARRANGEMENT

(71) Applicant: Jungheinrich Aktiengesellschaft, Hamburg (DE)

(72) Inventors: Michael Becker, Hainburg (DE); Jörg Cavelius, Bad Vilbel (DE); Timm Morawietz, Tholey-Überroth (DE); Markus Liebhaber, Oberursel (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 580 days.

(21) Appl. No.: 18/115,352

(22) Filed: Feb. 28, 2023

(65) Prior Publication Data

US 2023/0278789 A1　　Sep. 7, 2023

(30) Foreign Application Priority Data

Mar. 3, 2022　(EP) ..................................... 22160001

(51) Int. Cl.
　　*B65G 1/04*　　　　(2006.01)
　　*B65G 1/06*　　　　(2006.01)
　　　　(Continued)

(52) U.S. Cl.
　　CPC ......... *B65G 1/0471* (2013.01); *B65G 1/0407* (2013.01); *B65G 1/0478* (2013.01);
　　　　(Continued)

(58) Field of Classification Search
　　CPC ................ B65G 1/0471; B65G 1/0407; B65G 1/0478; B65G 1/0492; B65G 1/065;
　　　　(Continued)

(56) References Cited

U.S. PATENT DOCUMENTS

2018/0000441 A1　　1/2018　Wang et al.
2021/0122569 A1　　4/2021　Cavelius et al.
　　　　(Continued)

FOREIGN PATENT DOCUMENTS

DE　　10 2013 102 778　　　9/2014
EP　　　3 188 987 B1　　12/2020
　　　　(Continued)

OTHER PUBLICATIONS

European Search Report issued in EP Patent Application No. 22160001.8, dated Sep. 14, 2022.
　　　　(Continued)

*Primary Examiner* — Thomas Randazzo

(74) *Attorney, Agent, or Firm* — GREENBLUM & BERNSTEIN, P.L.C.

(57)　　　　ABSTRACT

A block stacking arrangement that includes a plurality of container receiving slots, a loading space arranged in the direction of gravity below the container receiving slots and at least one loading vehicle conFIGUREd to be moved in the loading space and that can be positioned the container in the container receiving slots and removed from the container receiving slots. The intention is to be able to reliably design the operation of a block stacking arrangement. For this purpose, the block stacking arrangement includes a loading vehicle maintenance area that is connected to the loading space via a travel path.

15 Claims, 1 Drawing Sheet

(51) Int. Cl.
  *E04H 5/02*       (2006.01)
  *G05D 1/00*       (2024.01)
(52) U.S. Cl.
  CPC ........... *B65G 1/0492* (2013.01); *B65G 1/065*
      (2013.01); *E04H 5/02* (2013.01); *G05D 1/021*
      (2013.01); *B65G 2201/0235* (2013.01)
(58) Field of Classification Search
  CPC ......... B65G 2201/0235; B65G 1/1378; E04H
      5/02; G05D 1/021
  See application file for complete search history.

(56)         References Cited

U.S. PATENT DOCUMENTS

| | | | |
|---|---|---|---|
| 2021/0122570 A1* | 4/2021 | Cavelius | ............... G06Q 10/08 |
| 2021/0162877 A1 | 6/2021 | Austrheim | |
| 2021/0221457 A1* | 7/2021 | Wen | ........................ B62D 65/12 |
| 2023/0249910 A1* | 8/2023 | Leiking | ............... B65G 57/302 |
| | | | 700/214 |
| 2023/0356943 A1 | 11/2023 | Frissenbickler | |

FOREIGN PATENT DOCUMENTS

| | | | | | |
|---|---|---|---|---|---|
| EP | 3 812 305 | A1 | 4/2021 | | |
| EP | 3 812 307 | A1 | 4/2021 | | |
| JP | H11-85281 | A | 3/1999 | | |
| JP | 2009-73625 | A | 4/2009 | | |
| JP | 2014-186377 | A | 10/2014 | | |
| JP | 2019-503286 | A | 6/2017 | | |
| JP | 2018-188244 | A | 11/2018 | | |
| WO | 2016/033628 | | 3/2016 | | |
| WO | 2017/109395 | A1 | 6/2017 | | |
| WO | 2020/200799 | | 10/2020 | | |
| WO | WO-2021058218 | A1 * | 4/2021 | ............. | B65G 1/065 |
| WO | 2021/259993 | A2 | 12/2021 | | |

OTHER PUBLICATIONS

Office Action issued in counterpart EP Patent Application 22160001.8 on Dec. 11, 2025, and English language translation thereof.
Office Actioned issued in counterpart JP Patent Application 2023-031486 on Mar. 17, 2026 and English language translation thereof.

* cited by examiner

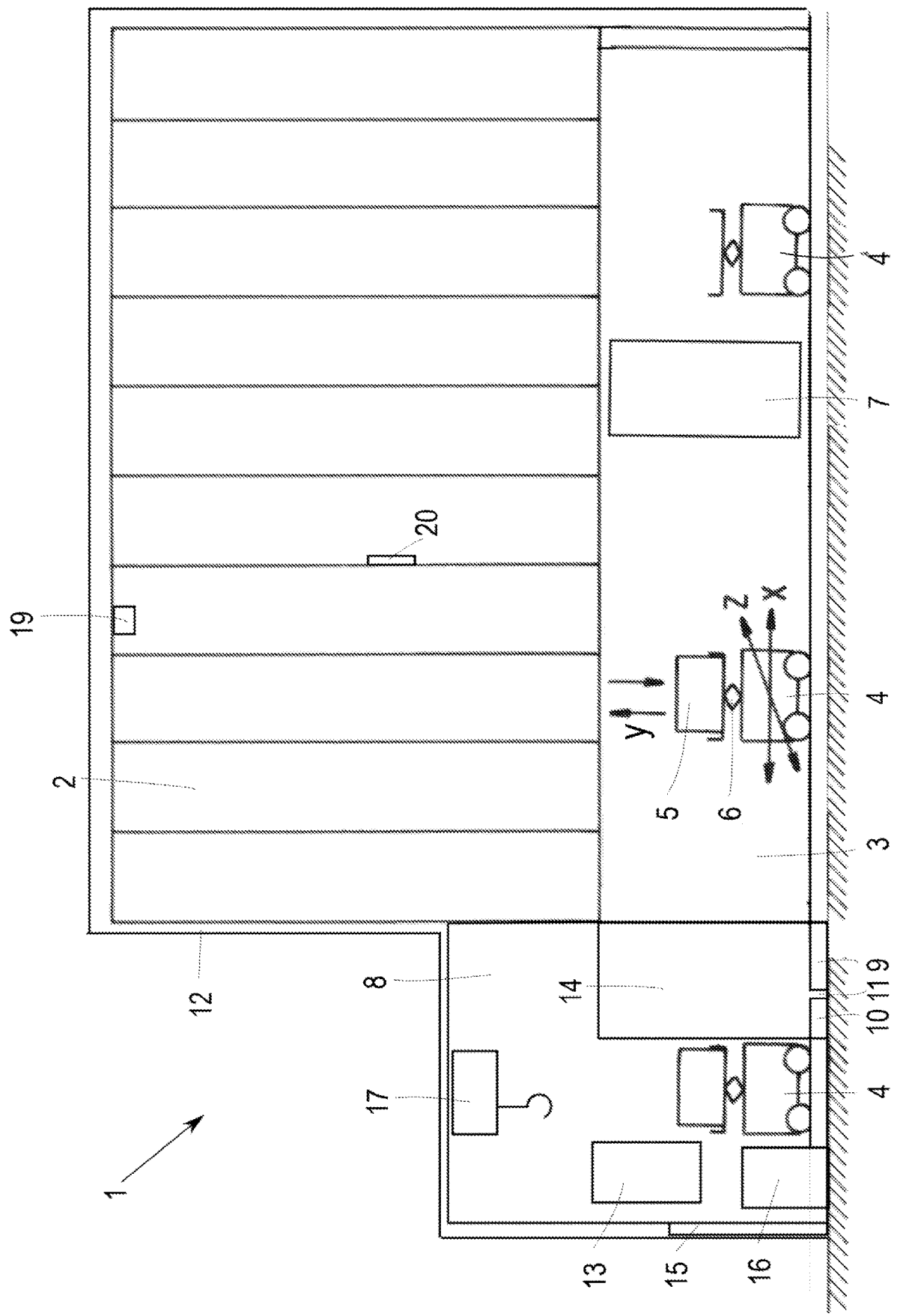

BLOCK STACKING ARRANGEMENT

CROSS-REFERENCE TO RELATED APPLICATION

This application claims priority under 35 U.S.C. § 119(a) to Europe application Ser. No. 22/160,001.8, filed Mar. 3, 2022, the disclosure of which is expressly incorporated by reference herein in its entirety.

BACKGROUND

1. Field of the Invention

The present invention relates to a block stacking arrangement comprising a plurality of container receiving slots, a loading space arranged in the direction of gravity below the container receiving slots and at least one loading vehicle, which can be moved in the loading space, and which can be stored with the container in the container receiving slots and removed from the container receiving slots.

2. Discussion of Background Information

Many containers can be stored in a space-saving manner in such a block stacking arrangement. The containers can be stored in the container receiving slots in the form of stacks. Since the containers stand directly on top of one another, a large packing density of the containers results in the direction of gravity. The container receiving slots themselves can also be relatively closely adjacent in the horizontal direction so that, here too, a relatively high packing density of the containers results. Since the containers are put into a container receiving slot from below and are also removed from the container receiving slot in a downward direction, the time required to access the containers to be removed is relatively short in each case.

The loading vehicle is used for placing a container into a container receiving slot and for removing a container from the container receiving slot. The loading vehicle can, on the one hand, be moved into a position in which it is located under a container receiving slot in order to put a container into storage or remove it. On the other hand, it has a lifting device with which a container can be lifted so that it can be placed into the container receiving slot or lowered in order to remove a container from the container receiving slot.

SUMMARY

An object of the invention is to provide a reliable operation of a block stacking arrangement.

This object is achieved in a block stacking arrangement of the type mentioned at the outset in that the block stacking arrangement has a loading vehicle maintenance area which is connected to the loading space via a travel path.

The loading vehicle maintenance area, which is referred to below as "maintenance area" for short, forms a maintenance station for the loading vehicle in which the loading vehicle can be inspected and if necessary repaired. The maintenance area is preferably dimensioned in such a way that it can accommodate all loading vehicles provided in the block stacking arrangement. The maintenance area can then be used for safeguarding purposes, for example. If it becomes necessary for a maintenance person to enter the block stacking arrangement, all loading vehicles will be moved into the maintenance area and can then no longer endanger a maintenance person in the block stacking arrangement.

Preferably, the maintenance area is arranged laterally next to the loading space transversely to the direction of gravity. In particular, it can be provided that the maintenance area adjoins the loading space. The maintenance area then continues the loading space laterally, wherein it is entirely possible for the maintenance area to have a different height in the direction of gravity than the loading space. This arrangement results in the maintenance area having a very space-saving arrangement. Also, travel paths for the loading vehicle from the loading space into the maintenance area are kept short.

Preferably, the container receiving slots and the loading space are surrounded by a common housing and the maintenance area is arranged within the housing. The housing can be provided for fire protection reasons. Within the housing, an atmosphere can be maintained which, for example, is oxygen-reduced, so that a fire cannot develop or can develop only with difficulty. If the maintenance area is likewise arranged within the housing, the loading vehicle or the loading vehicles can be moved from the loading space into the maintenance area when a fire situation occurs, or even when a fire situation is suspected, without the risk of oxygen ingress.

Preferably, the housing has a window in the region of the maintenance area. A maintenance person can then visually inspect the loading vehicle located in the maintenance area. In the block stacking arrangement, a fire hazard primarily originates in the loading vehicle or the loading vehicles. The maintenance person can then immediately recognize whether smoke is being emitted at a loading vehicle.

An airlock facility, or airlock, is preferably arranged between the maintenance area and the loading space. The airlock facility then forms a barrier between the maintenance area and the loading space, so that the maintenance area and loading space atmospheres can be kept separate from one another.

The maintenance area preferably has a height which corresponds to an extension of the loading vehicle in the direction of gravity plus a working space. A maintenance person can thus also inspect and handle the loading vehicle from above. The maintenance area is therefore generally also higher than the loading space. The loading space is generally only slightly higher than the loading vehicle. The loading space is made as low as possible in order to use as little space as possible for the loading space.

Preferably, the maintenance area has a height of at least 1.8 m. It is thus possible for most maintenance personnel to enter the maintenance area in an upright position, so that a comfortable working position is facilitated when the loading vehicle or the loading vehicles are being maintained.

Preferably, the maintenance area is closed by a secured access door. It is thus possible to prevent a maintenance person from entering the maintenance area, for example, precisely when a loading vehicle is entering the maintenance area.

Preferably, a smoke detector is provided which is connected to a steering device, or steerer, which, in the event of a smoke detection signal being generated by the smoke detector, steers the loading vehicle into the maintenance area. For example, if smoke is detected, which is possible by a smoke extraction system, the loading vehicles will be automatically brought into the maintenance area. Loading vehicles will thus no longer be located below the container receiving slots. Here, the containers accommodated in the container receiving slots form potential incendiary material.

A temperature sensor can also be provided, which is connected to a steering device, a steerer, which, in the case of a temperature detected by the temperature sensor exceeding a predetermined threshold value, steers the loading vehicle into the maintenance area. The temperature sensor, which can also generally be referred to as a "fire detector", detects whether an impermissibly high temperature is appearing, which indicates a fire or a developing fire in the block stacking arrangement. In this case too, the loading vehicles will be immediately driven out of the loading space in order to minimize the probability of the fire spreading from the loading vehicle to the containers overhead with goods stored therein. The loading vehicle in the maintenance area can be directly accessed by the fire department.

The travel path is preferably formed by a rail arrangement. The rail arrangement can thus run from the loading space into the maintenance area.

Preferably, the rail arrangement is formed by a linear extension of rails on which the loading vehicle can be moved in the loading space. It is thus no longer necessary to transfer the loading vehicle from one rail system to another rail system in order to move it into the maintenance area.

A charging station is preferably provided in the maintenance area. The charging station can charge a rechargeable battery in the loading vehicle when the loading vehicle is in the maintenance area.

Preferably, the maintenance area has a lifting device, or lifter, the limit load of which is greater than a mass of the loading vehicle. The lifting device can be designed, for example, as a trolley or crane, so that a loading vehicle in the loading space can be placed on the rails or lifted for repair purposes.

Other exemplary embodiments and advantages of the present invention can be ascertained by reviewing the present disclosure and the accompanying drawing.

BRIEF DESCRIPTION OF THE DRAWINGS

The present invention is further described in the detailed description that follows with reference to the noted single FIGURE of drawing by way of a non-limiting exemplary embodiment of the present invention directed to a schematic illustration of a block stacking arrangement.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawing making apparent to those skilled in the art how the present invention may be embodied in practice.

A block stacking arrangement 1 has a plurality of container receiving slots 3. A stack of containers can be received in each container receiving slot. A loading space 3 is arranged below the container receiving slots 2 in the direction of gravity. A plurality of loading vehicles 4 can be moved in the loading space 3. The loading vehicles 4 serve to store a container 5 in a container receiving slot 2 or to remove the container 5 from the container receiving slot 2.

For this purpose, the loading vehicle 4 has a lifting device 6, so that the container 5 can be raised or lowered in the direction of gravity, as shown by the arrow y.

The container receiving slots 2 are arranged next to one another in a row which extends in a direction "X". A plurality of such rows are arranged next to one another perpendicular thereto. This is represented by the "Z" direction. The loading vehicles 4 can be moved both in the direction of the rows, i.e., in the X direction, and transversely thereto, i.e., in the Z direction.

The loading space 3 has a door 7 through which a maintenance person can enter the loading space 3.

The block stacking arrangement 1 has a loading vehicle maintenance area 8, which is referred to in the following simply as "maintenance area 8". The maintenance area 8 is connected to the loading space 3 via a travel path which, in the present case, is formed by a rail arrangement 9, 10. The rail arrangement 9, 10 has first rails 9, which extend into the loading space 3, and second rails 10, which are located only in the maintenance area 8. In order to make this clear, the rail arrangement 9, 10 has a gap 11. However, this is not necessary. The rail arrangement 9, 10 can also be formed by continuous rails.

The maintenance area 8 is arranged laterally next to the loading space 3 transversely to the direction of gravity and adjoins the loading space 3. The loading vehicle 4 can thus pass directly from the loading space 3 into the maintenance area 8 without having to travel over longer distances.

The container receiving slots 2 and the loading space 3 can be enclosed by a common housing 12. The housing 12 also includes the maintenance area 8—the maintenance area 8 is therefore arranged within the housing 12. The aforementioned door 7 allows a maintenance person to pass through the housing 12. The housing 12 is required in systems which are protected against fire risk by oxygen reduction.

In other types of extinguishing systems, a housing may be unnecessary. In this case, the container receiving slots 2 and the loading space 3 can be surrounded by a protective fence or a similar paneling, which is also included under the term "housing". The maintenance area 8 can also be used in systems with water-extinguishing systems (sprinklers) in order to avoid the risk of flames jumping onto the containers.

The housing 12 has a window 13 in the region of the maintenance area 8. For reasons of a clear overview, this window 13 is arranged in a wall which extends parallel to the rows of the container receiving slots 2. However, the window 13 can also be arranged in another wall. The window 13 makes it possible to look into the maintenance area 8 from the outside, for example in order to detect whether there are any unusual situations here. For example, it can be determined whether a loading vehicle 4 located in the maintenance area 8 is emitting smoke.

An airlock device 14, or airlock, is arranged between the maintenance area 8 and the loading space 3. The airlock device 14 can be used to separate the atmosphere in the loading space 3 from the atmosphere in the maintenance area 8. This is advantageous, for example, when an atmosphere with reduced oxygen content is to be maintained in the loading space 3 and in the container receiving slots 2, which is often desirable for fire safety reasons, but a normal oxygen content in the ambient air is wanted in the maintenance area 8.

In order to enable a maintenance person to enter the maintenance area, a secured access door 15 is provided, which closes the maintenance area 8 to the outside. The access door 15 is shown here with a relatively low height. However, it can be higher.

The maintenance area 8 has a height in the direction of gravity that is significantly greater than an extension of the loading vehicle 4 in the direction of gravity. A working space is provided above the loading vehicle 4, so that a maintenance or operating person will also have access to the loading vehicle 4 from above, for example in order to be able to carry out repairs there.

The maintenance area has a height of at least 1.8 m in the direction of gravity. This means that most maintenance personnel can walk therein in an upright position.

Furthermore, a charging station 16 is provided in the maintenance area 8, by means of which charging station a rechargeable battery of the loading vehicle 4 can be charged when the loading vehicle 4 is located in the maintenance area 8.

The maintenance area 8 furthermore has a lifting device 17 that can be designed, for example, as a trolley or as a crane. The loading vehicle 4 can be lifted using the lifting device 17 so that it can be set on the rails 10.

The maintenance area 8 preferably has an extension perpendicular to the row of container receiving slots 2 (i.e., perpendicular to the drawing plane according to the FIGURE), which corresponds to the extension of all container receiving slots 2 in the Z direction. The maintenance area 8 thus has a relatively large size so that preferably all loading vehicles 4, which are present in the block stacking arrangement 1, can move into the loading space 8 if this should be necessary.

The block stacking arrangement 1 has a smoke detector 19 which generates a smoke detection signal when it detects smoke. This smoke detection signal can be forwarded to the loading vehicle 4 or the loading vehicles 4. In this case, each loading vehicle 4 has a steering device which steers the loading vehicle 4 into the maintenance area 8 as soon as it receives the smoke detection signal.

Smoke can arise, for example, when a loading vehicle 4 overheats during operation. If the loading vehicles 4 are moved into the maintenance area in the event of a smoke signal from the smoke detector 19, two advantages are achieved. On the one hand, the loading vehicles 4 are moved away from under the containers stored in the container receiving slots 2. i.e., away from potential incendiary material. On the other hand, it can be seen in this way whether the smoke originates from a loading vehicle 4 or from a container or an object accommodated in a container. Fire-fighting measures can thus be effectively controlled.

The smoke detector 19 is arranged here at an upper end of a loading space 2. However, this is not mandatory. The smoke detector 19 can also be arranged at a different position.

Furthermore, the block stacking arrangement has a temperature sensor 20, which generates a temperature signal when it detects a temperature which has risen above a prespecified setpoint value. This temperature signal can also be transmitted to a steering device in the loading vehicle 4, which then likewise moves the loading vehicle 4 into the maintenance area 8. The same applies here as for the smoke detection signal. If the loading vehicle 4 has been moved out of the loading space 3, it will no longer be located below potential incendiary material formed by the containers arranged in the container receiving slots 2 and by the objects located therein. In addition, it will then be possible to quickly determine whether the increased temperature originates in a loading vehicle 4 or in the containers or the goods accommodated therein.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A block stacking arrangement comprising:
a plurality of container receiving slots;
a loading space arranged below the container receiving slots in a direction of gravity; and
at least one loading vehicle with a lifting device, wherein the at least one loading vehicle is conFIGUREd to be moved into the loading space, and wherein the lifting device is conFIGUREd to raise a container in the direction of gravity to store the container in the container receiving slots and to lower a container in the direction of gravity to remove the container from the container receiving slots;
wherein the block stacking arrangement further comprises a loading vehicle maintenance area connected to the loading space via a travel path.

2. The block stacking arrangement according to claim 1, wherein an airlock is arranged between the maintenance area and the loading space.

3. The block stacking arrangement according to claim 1, wherein the maintenance area has a height that corresponds to an extension of the loading vehicle in the direction of gravity plus a working space.

4. The block stacking arrangement according to claim 1, wherein the maintenance area has a height of at least 1.80 m.

5. The block stacking arrangement according to claim 1, wherein the maintenance area is closed by a secured access door.

6. The block stacking arrangement according to claim 1, further comprising:
a smoke detector connected to a steerer, which, in the event of a smoke detection signal generated by the smoke detector, is conFIGUREd to steer the loading vehicle into the maintenance area.

7. The block stacking arrangement according to claim 1, further comprising:
a temperature sensor connected to a steerer which, in the case of a temperature detected by the temperature sensor exceeding a predetermined threshold value, is conFIGUREd to steer the loading vehicle into the maintenance area.

8. The block stacking arrangement according to claim 1, further comprising:
a loading station provided in the maintenance area.

9. The block stacking arrangement according to claim 1, wherein the maintenance area includes a lifter having a maximum working load of greater than a mass of the loading vehicle.

10. The block stacking arrangement according to claim 1, wherein the maintenance area is arranged laterally next to the loading space transversely to the direction of gravity.

11. The block stacking arrangement according to claim 10, wherein the maintenance area is adjacent to the loading space.

12. The block stacking arrangement according to claim 1, wherein the container receiving slots and the loading space are enclosed by a common housing and the maintenance area is arranged within the common housing.

13. The block stacking arrangement according to claim 12, wherein the common housing has a window in a region of the maintenance area.

14. The block stacking arrangement according to claim 1, wherein the travel path is formed by a rail arrangement.

15. The block stacking arrangement according to claim 14, wherein the rail arrangement is formed by a linear extension of rails on which the loading vehicle is movable in the loading space.

\*　\*　\*　\*　\*